July 8, 1952      T. MORENO      2,602,859

ULTRAHIGH-FREQUENCY DIRECTIONAL COUPLING APPARATUS

Filed March 11, 1947      3 Sheets—Sheet 1

INVENTOR
THEODORE MORENO
BY
Paul B. Hunter
ATTORNEY

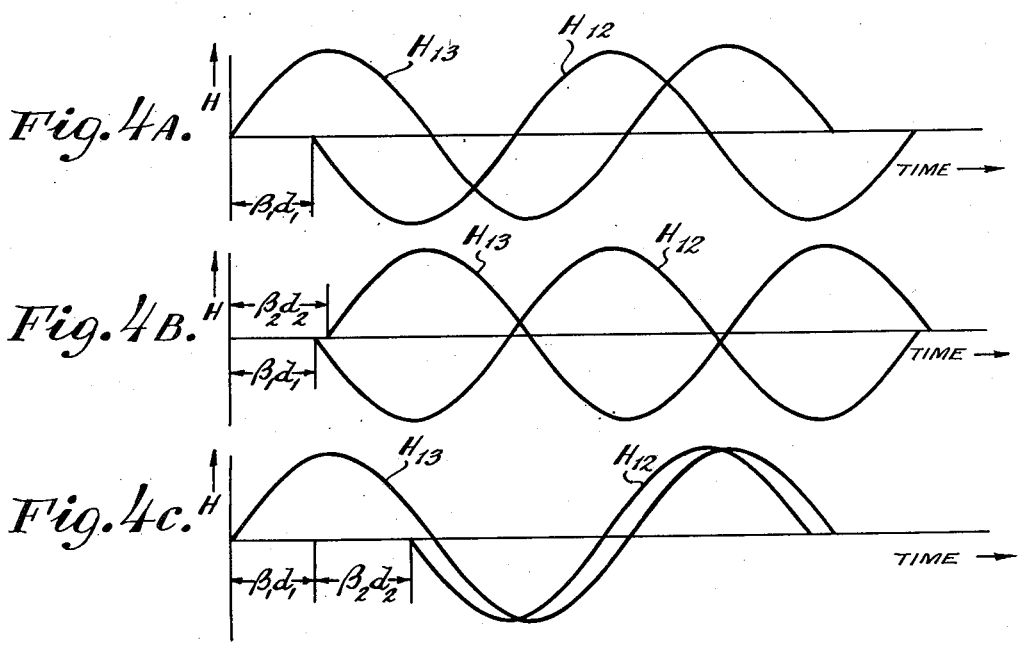
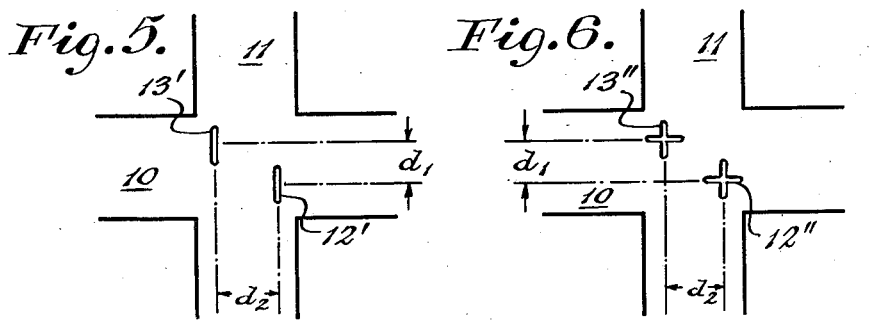
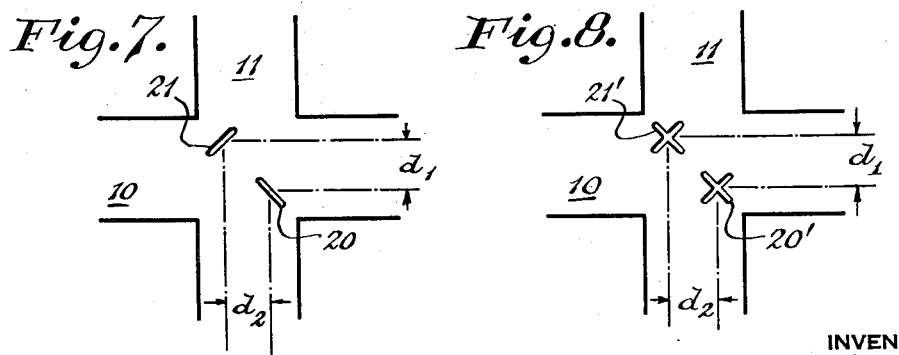
INVENTOR
THEODORE MORENO
BY
Paul B. Hunter.
ATTORNEY July 8, 1952     T. MORENO     2,602,859
ULTRAHIGH-FREQUENCY DIRECTIONAL COUPLING APPARATUS
Filed March 11, 1947     3 Sheets—Sheet 3

INVENTOR.
THEODORE MORENO
BY
Paul B. Hunter
ATTORNEY

Patented July 8, 1952

2,602,859

UNITED STATES PATENT OFFICE 2,602,859

ULTRAHIGH-FREQUENCY DIRECTIONAL COUPLING APPARATUS

Theodore Moreno, Cambridge, Mass., assignor to The Sperry Corporation, a corporation of Delaware Application March 11, 1947, Serial No. 733,913

11 Claims. (Cl. 178—44)

The present invention relates to electromagnetic energy couplers between ultra-high-frequency energy transmission lines, such as wave guides, dielectric guides, coaxial lines, or the like, and in particular relates to directional couplers between two such ultra-high-frequency transmission lines.

In order to connect measuring apparatus to an ultra-high-frequency energy transmission system, some means of radio frequency energy coupling must be provided. Such coupling means should preferably operate independently of the standing waves which may exist in the transmission line, and the amount of power which is extracted from the transmission line should preferably be a definite fraction of the power which is to be transmitted along the main transmission line. To obtain these advantageous conditions, it is highly desirable that the coupler operate in such a manner that an electromagnetic wave travelling in a single direction along the main line induces a wave travelling in a single direction along the coupling line. Likewise, a wave travelling in the opposite direction in the main line should induce a wave travelling in the opposite direction in the coupling line. A coupler which has these properties is known as a "directional coupler."

The performance of a directional coupler may be described in terms of two quantities:

1. *Attenuation.*—The attenuation of a coupler is the strength of the travelling wave in the main line relative to the strength of the travelling wave which it induces in the auxiliary or coupling line. This is a power ratio, usually expressed in decibels.

2. *Directivity.*—Only in the ideal coupler does a single wave travelling in the main line induce a wave travelling in a single direction in the second line. In a practical coupler, two waves travelling in opposite directions are induced in the auxiliary line. The induced waves are normally greatly unequal in strength. Their relative strength is the directivity of the coupler, also expressed in decibels.

One such known directional coupler consists of a short section of auxiliary rectangular wave guide coupled to a main rectangular wave guide transmission line. A narrow wall of the auxiliary section is fastened rigidly to a narrow wall of the main guide, keeping the longitudinal axes of both guides parallel. Coupling is provided between the main wave guide and the auxiliary section by a pair of longitudinally spaced holes in the common narrow side wall. A travelling wave in the main guide will induce a travelling wave in the auxiliary guide travelling in the same direction, since the path length of waves induced in the auxiliary guide through the first hole is equal to the path length of the waves induced therein through the second hole, and no electrical interference will occur. However, the path length of the oppositely directed travelling waves induced through the two holes into the auxiliary guide will be unequal. If this path length difference is equal to a half-wavelength, cancellation will result and no resultant wave will be induced in the auxiliary guide in a direction opposite to that of the travelling wave in the main guide.

In order to achieve such a half-wavelength path difference, it is necessary that the two holes be spaced one-quarter of a wavelength apart. This, of course, results in the directivity of the coupler being frequency-sensitive, and high directivity occurs only at a single operating frequency. Furthermore, since the auxiliary wave guide is oriented parallel to the main guide, it becomes somewhat awkward to make any desired wave guide connections to the auxiliary guide unless bends or elbows are provided in the ends of the auxiliary section. Also, since the two guide sections are connected side by side along their narrow wall, the coupler is bulky and is somewhat difficult to handle.

An illustrative coupler constructed in accordance with the present invention comprises a short section of auxiliary rectangular wave guide mounted at right angles to a main rectangular wave guide section with the two guides having their broad faces in contact. Coupling is accomplished between the two guides by means of a pair of apertures cut into the common wall section. The center lines of the two guides effectively divide the common wall section into four quadrants and the pair of apertures are situated in diagonally opposite quadrants. By proper selection of aperture shape and correct positioning in the common wall section, in accordance with the principles of the invention, it is possible to construct a directional coupler having directivity properties which are substantially independent of the frequency of the wave energy travelling in the main guide.

The present invention therefore provides a directional coupler which has a high directivity that is essentially independent of frequency, thus greatly increasing its utility. The convenient mechanical arrangement of the wave guide sections permits conventional wave guide coupling to either end of the auxiliary guide without the use of elbows, and the arrangement further presents a compact coupler which may be easily handled.

An additional advantage of the present coupler is in the wide design latitude which enables one to select the attenuation value of the coupler as desired. Since the attenuation varies with aperture size, shape and disposition, many design parameters are available which permit the coupler attenuation to be selected from a broad range.

It is, therefore, an object of the present invention to provide a directional coupler having a high directivity that is essentially independent of frequency.

It is a further object of the present invention to provide a wave guide coupler formed of a main and an auxiliary wave guide section in which the guide axes are perpendicular.

It is still a further object of the present invention to provide a wave guide coupler formed of a pair of rectangular wave guides in which the two guides have their broad faces in contact.

It is still another object of the present invention to provide a coupler formed of a pair of coupled transmission lines in which the attenuation between the two lines may be selected from a broad range of values.

The invention also relates to the novel features or principles of the instrumentalities described herein, whether or not such are used for the stated objects, or in the stated fields or combinations.

Other objects and advantages of the present invention will become apparent from a consideration of the following specification and attached drawing, wherein.

Figure 1:
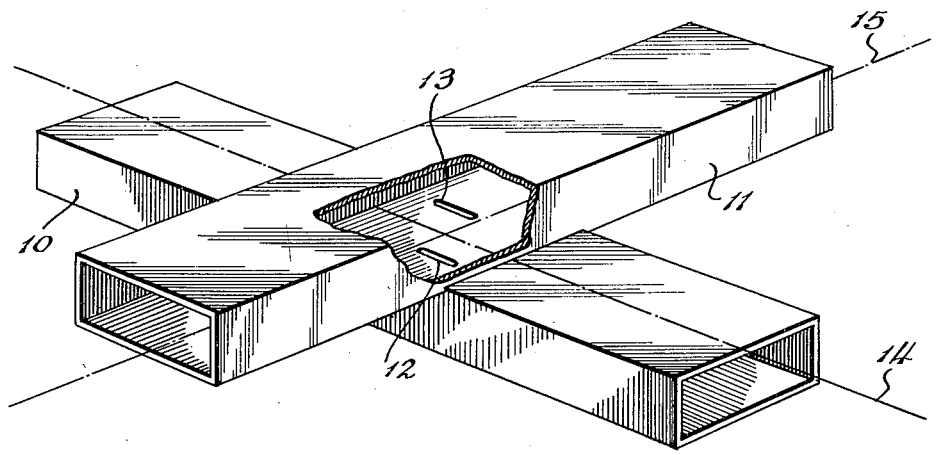
Fig. 1 shows a perspective view of the arrangement of wave guides in a coupler according to the invention, with a cut-away portion showing the coupling slots.

Figs. 4a, b and c are time graphs of magnetic field intensities at various points in the coupler shown in Fig. 1 useful in explaining the operation thereof; and Figs. 5–8 show modifications of the slot arrangement of a coupler constructed according to the invention.

Figure 9:
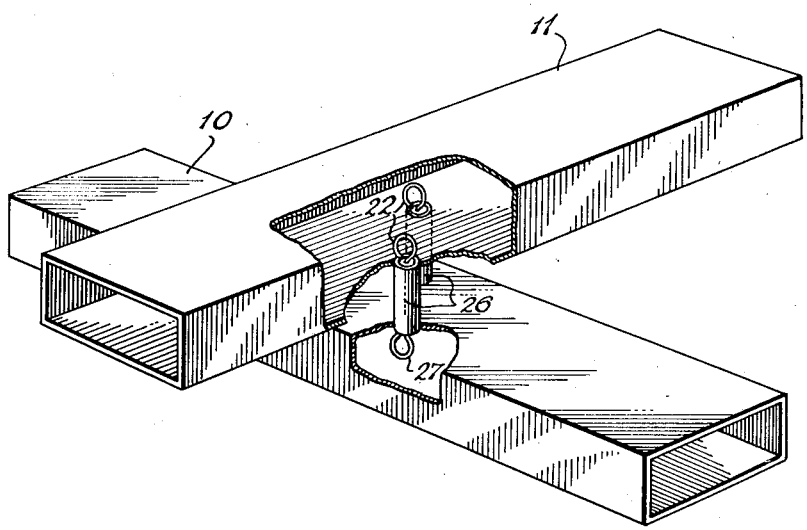

Fig. 9 shows a perspective view of a modification of the coupler according to the invention in which the coupling slots are replaced by coupling loops, and shows how the guides may be separated a desired distance apart.

Figure 10:
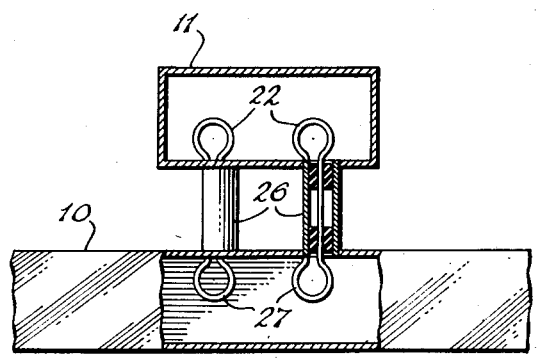

Fig. 10 shows another view of the device illustrated in Fig. 9.

Fig. 1 shows one form of coupler according to the invention illustrated in wave guide form. Referring to Fig. 1, there is shown a pair of rectangular wave guides 10 and 11 having their broad faces in contact and their axes perpendicular to one another. Energy is transferred between wave guides 10 and 11 by means of coupling slots 12 and 13 cut in the broad wall section which is common to the two guides. Slots 12 and 13 are disposed parallel to the longitudinal axis of wave guide 10 and are positioned equidistantly on opposite sides of the center line 14 of the upper face of wave guide 10. They are also displaced equidistantly on opposite sides of the center line 15 of the lower face of wave guide 11.

Figure 2:
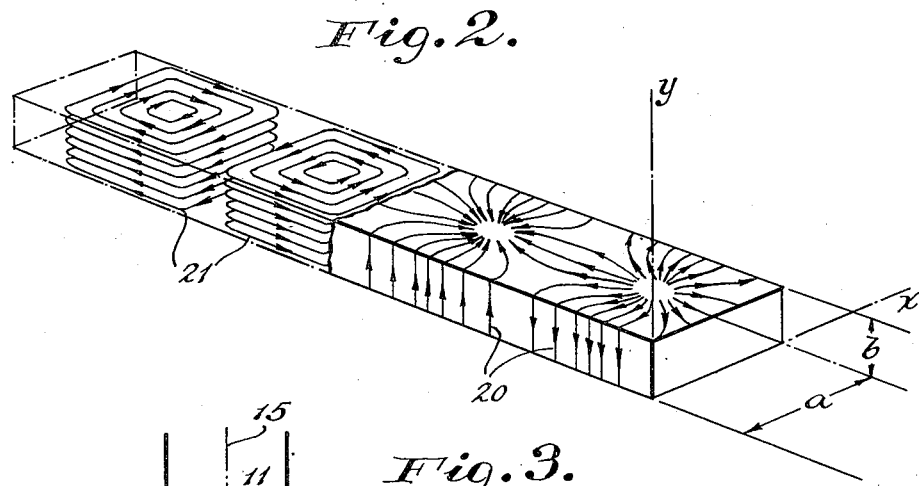
Fig. 2 shows the instantaneous pattern of surface current and magnetic field inside a rectangular wave guide excited in the dominant mode.

The instantaneous magnetic field that exists in wave guide 10 when excited in the dominant mode is shown in Fig. 2. The instantaneous surface current pattern is also shown. On the narrow faces of the wave guide, components of surface current represented by solid lines 20 flow only in the $y$ direction (guide thickness) and the current density is independent of the $y$ dimension. Correspondingly, the tangential magnetic field (represented by lines 21) at the surface of the narrow faces has components only in the axial or $z$ direction.

On the broad faces of the guide, the surface current has components both in the $x$ and $z$ directions. The $z$ component of surface current density (and correspondingly the $x$ component of magnetic field intensity) varies as $$\sin \frac{\pi x}{a}$$

reaching a maximum value at the center of the broad face and falling to zero at the edges. The $x$ component of surface current density (and correspondingly the $z$ component of magnetic field intensity) varies as $$\cos \frac{\pi x}{a}$$

reaching a maximum at the edges of the broad face, and passing through zero with a reversal of phase at the center. This reversal of phase is important to note, as it leads to the marked frequency-independent directivity that is characteristic of a wave guide directional coupler constructed according to the teachings of this invention.

Figure 3:
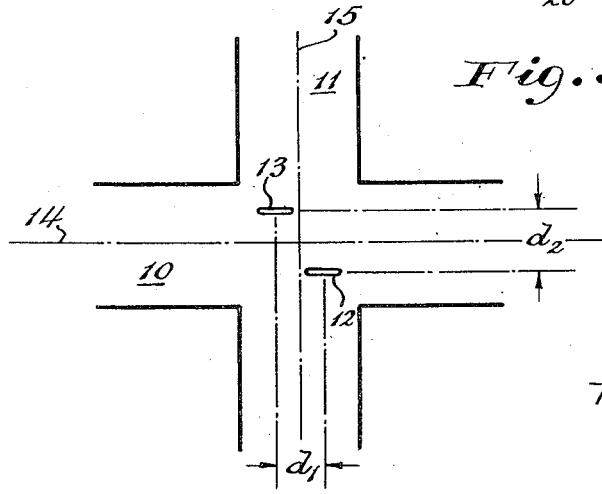
Fig. 3 shows diagrammatically the arrangement of coupling slots shown in coupler of Fig. 1.

Fig. 3 shows diagrammatically the arrangement of coupling slots 12 and 13 of the directional coupler shown in Fig. 1. These slots are used to couple the axial magnetic field (the $z$ component of magnetic field) in wave guide 10 to the transverse magnetic field (the $x$ component of magnetic field) in wave guide 11. If a signal is fed in from the left end of guide 10, slot 13 receives maximum excitation first, and slot 12 receives maximum excitation a short time later, because of its longitudinal axial displacement $d_1$ relative to slot 13. Electrically slot 13 receives maximum excitation at a phase different from slot 12 by an amount $B_1 d_1 + \pi$ where $B_1$ is the phase constant of the guide 10 and equals $2\pi$ divided by the wavelength of the transmitted energy as measured in the wave guide. The phase difference $B_1 d_1$ arises from the longitudinal displacement $d_1$ of the two slots and the quantity $\pi$ arises from the 180° phase difference between the axial magnetic fields on the opposite sides of the center line 14 of guide 10.

The curves shown in Figs. 4a, 4b and 4c may aid in understanding the phase relationship of the various waves induced in the auxiliary guide 11 through the coupling holes 12 and 13. Fig. 4a is a time plot of the magnetic field intensity induced in auxiliary guide 11 by each slot, measured at the location of the inducing slot itself. That is, curve $H_{13}$ is a time plot measured at slot 13 of the magnetic field intensity induced in guide 11 by slot 13. Curve $H_{12}$ is a time plot measured at slot 12 of the magnetic field intensity induced in guide 11 by slot 12. It will be noted that curve $H_{12}$ lags behind $H_{13}$ by phase delay of amount $B_1 d_1 + \pi$. As stated above, the phase difference $B_1 d_1$ is due to the longitudinal displacement $d_1$ of the two coupling slots along guide 10 and the quantity $\pi$ is due to the opposite phases of the magnetic field at opposite sides of the center line 14 of wave guide 10.

The wave $H_{13}$ induced in guide 11 by slot 13 will travel along guide 11 in both directions, as will the wave $H_{12}$ induced therein by slot 12. The wave induced by slot 13 which travels toward slot 12 will be delayed in guide 11 with respect to the wave induced by slot 12 travelling in the same direction by an amount equal to $B_2d_2$, where $B_2$ is the phase constant of wave guide 11 and $d_2$ is the separation between slot 13 and slot 12 measured along guide 11.

Figure 4b is a time plot of the magnetic field intensity measured at the location of slot 12, using the same time scale as in Fig. 4a. Curve $H_{13}$ is a time plot of the magnetic field intensity of the wave induced by slot 13 and travelling toward slot 12 as measured at slot 12 and curve $H_{12}$ is a measure of the magnetic field intensity of the wave $H_{12}$ induced by slot 12 also measured at slot 12. It can be seen that curve $H_{13}$ has been shifted in phase from its position in Fig. 4a by an amount $B_2d_2$. This is because in Fig. 4b the magnetic field intensities are all taken at slot 12, and a wave travelling in guide 11 the distance $d_2$ from slot 13 to slot 12 would suffer a phase delay equal to $B_2d_2$. It is readily seen from Fig. 4b that curves $H_{13}$ and $H_{12}$ are approximately 180° out of phase and as such will tend to cancel each other. If phase displacement $B_1d_1$ exactly equals phase displacement $B_2d_2$ the two waves will be exactly out of phase and complete cancellation will result if their amplitudes are equal.

Fig. 4c is a time plot of the magnetic field intensities measured at the location of slot 13 and shows how the induced waves travelling in guide 11 in a direction from slot 12 toward slot 13 combine. Curve $H_{13}$ is, as in Fig. 4a, a time plot measured at slot 13 of the magnetic field intensity of the wave induced by slot 13. Curve $H_{12}$ is a time plot also measured at slot 13 of the magnetic field intensity of the wave induced in guide 11 by slot 12. In this figure it is seen that the wave of curve $H_{12}$ suffers an additional phase lag from its position in Fig. 4a (measured at slot 12) of $B_2d_2$. This additional phase lag causes, in general, the wave represented by curve $H_{13}$ to reenforce the wave represented by curve $H_{12}$ with the result that a resultant wave will travel in guide 11 in a direction from slot 12 to slot 13.

The complete cancellation of the induced waves in guides 11 which travel in the direction from slot 13 toward slot 12 occurs when phase displacement $B_1d_1$ exactly equals phase displacement $B_2d_2$ as shown in Fig. 4b. The magnitude of the phase constant B is dependent only upon the guides cross-sectional dimensions and the frequency of the energy being transmitted through the guide. Therefore, if the coupler is constructed of two guide sections having the same cross-sectional dimensions, as is the usual case, the phase constants of the two guide sections will be equal regardless of the frequency of the energy being transmitted. Of course, the magnitude of B will change with changing frequency, but the two phase constants will remain equal.

Therefore, by making the dimensions $d_1$ and $d_2$ equal in a coupler formed of guide sections having identical cross-sections, the product $B_1d_1$ will exactly equal the product $B_2d_2$ at all operating frequencies. Since this condition ($B_1d_1=B_2d_2$) in such a coupler as shown in Fig. 1 is the required condition for complete cancellation of induced energy in one direction in the auxiliary guide, the directivity of such a coupler is thus seen to be completely independent of operating frequency.

Furthermore, in general, reinforcement will occur between the waves which are induced in the auxiliary guide which travel in the direction opposite to the direction in which cancellation occurs. It is only in the very special case where the sum of the phase displacements $B_1d_1$ and $B_2d_2$ equals some multiple of $2\pi$ that cancellation could occur in this direction. Under practical operating conditions, the product $B_1d_1$ or its equal $B_2d_2$ is generally approximately $\pi/2$ so that their sum is much less than $2\pi$.

One coupler constructed in this manner using $1'' \times \frac{1}{2}''$ wave guide with .050'' wall thickness was found to have a directivity in excess of 30 decibels when tested over the wavelength range 3.1–3.7 centimeters. The attenuation of this coupler was measured to be 40 decibels. In this coupler the length of the slots was 0.282'' and the width was 0.063''. The distance $d_1$ equaled $d_2$ and its magnitude was 0.517''.

Fig. 5 shows a modification of the coupler shown in Fig. 3. Main wave guide section 10 is again oriented at right angles to auxiliary wave guide section 11 and has a common broad wall section therewith. Coupling slots 12' and 13' are cut in the common wall section parallel to the longitudinal axis of auxiliary wave guide section 11 and are positioned at equal distances on opposite sides of the center line of auxiliary wave guide 11. They are also displaced at equal distances about the center line of main wave guide 10.

In operation, the slots 12' and 13' serve to couple the transverse magnetic field of main wave guide 10 to the longitudinal magnetic field of auxiliary wave guide 11. An incident wave introduced from the left side of main guide 10 will induce a wave in auxiliary guide 11 in travelling in the direction from coupling slot 12' to coupling slot 13'. Cancellation will occur in the opposite direction. As in the previous example, this cancellation occurs when $B_1d_1=B_2d_2$ and the resulting directivity of the coupler is completely independent of frequency when $B_1=B_2$, $d_1=d_2$.

If it is desired to lower the attenuation of the directional couplers shown in Figs. 3 and 5 the area of the slots should be increased. In practice it has been found possible to increase the slot length to a value which equals one quarter of a wavelength without interfering with the frequency-insensitivity attenuation. Increasing the slot width also lowers the attenuation. If the width is doubled the attenuation decreases approximately 3 decibels. Care must be taken, however, not to make the ratio of length to width too small; otherwise undersirable electric field coupling occurs with a loss in directivity.

Fig. 6 shows a further modification of the present invention which is a combination of the embodiments shown in Figs. 3 and 5. As in the previously described couplers, a main wave guide section 10 is arranged perpendicular to an auxiliary wave guide section 11. A pair of cross-shaped apertures 12'' and 13'' are disposed symmetrically along a diagonal of the broad wall face section common to the perpendicular wave guide sections. The distance $d_2$ is measured along guide 10 between the geometric centers of apertures 12'' and 13'', and distance $d_1$ as measured along guide 11 between the same points. In this modification the coupling slots 12 and 13 of the modification shown in Fig. 3 are, in effect, superimposed upon the coupling slots 12' and 13' of Fig. 5. This results in the pair of cross-shaped apertures 12" and 13". By using the cross-shaped apertures, the same frequency-insensitive directivity results when $B_1=B_2$ and $d_1=d_2$, but because of the larger total slot area with equivalent slot dimensions, this type of coupler has a lower attenuation. In practice, such couplers having slots in the shape of crosses have an attenuation approximately 3 decibels less than the coupler using simple slots having comparable dimensions.

Another modification of the present invention is shown in Fig. 7. As in the other modications, main wave guide 10 is oriented at right angles to auxiliary wave guide 11 and has a common broad wall section therewith. Coupling slots 20 and 21 are symmetrically located along a diagonal of the common wall section, with slot 20 being parallel to the diagonal and slot 21 being normal to the diagonal. The distances $d_1$ and $d_2$ for such diagonal slots are measured from the geometric centers and are preferably equal, as are $B_1$ and $B_2$, to obtain the frequency-insensitivity characteristic of the invention.

One advantage of such a slot arrangement over those shown in Figs. 3 and 5 is that, for a common wall section of a given size, it is possible to have longer slots. This reduces the attenuation as compared with the simple parallel slot arrangement of Fig. 3 or 5, without appreciably affecting the frequency insensitivity of the directivity.

A coupler using 1" x 1½" rectangular guide with .050" wall thickness was built having such diagonal slots whose length was .387" and whose width was .063". The distance $d_1$ was made equal to $d_2$ and was .523". When tested over the wavelength range 3.1–3.7 centimeters this coupler was found to have an attenuation of 30 decibels, which is approximately 10 decibels lower than the parallel slot type coupler. The frequency-insensitive directivity remained in the order of 30 decibels over the entire band.

If still lower attenuation in a directional coupler is desired without lowering the directivity, the modification shown in Fig. 8 is useful. This modification shows wave guide sections 10 and 11 oriented at right angles and having a common broad-wall section. Crossed slots 20' and 21' are arranged symmetrically along a diagonal of the common wall section with the arms oriented at 45° to the axes of the wave guide sections forming the coupler. The distances $d_1$ and $d_2$ are measured along the axes of guides 11 and 10 respectively from the geometric centers of apertures 20' and 21'. The same frequency-insensitive directivity results with such a coupler as in the simple diagonal slot arrangement of Fig. 7 provided $B_1=B_2$ and $d_1=d_2$, but because of the larger total slot area with equivalent slot dimensions, this type of coupler has a lower attenuation. In practice, a coupler having crossed diagonal slots arranged symmetrically along a diagonal of the common wall has an attenuation of approximately 3 decibels less than a coupler using simple diagonal slots having comparable dimensions.

Other forms of wave guide may be used rather than rectangular. If it is desired to use elliptical or circular wave guides instead of rectangular wave guides in the construction of a directional coupler, it is possible to provide a flattened portion in the common wall section where the main and auxiliary units are joined at right angles. By using any of the coupling modifications described above, it will then be possible to construct a directional coupler which has a high directivity which is independent of operating frequency. The mechanical advantage of having the couplers oriented at right angles will also be realized.

In some cases it may be desired to construct a coupler in which the two wave guide sections are not oriented exactly at 90° to each other. Small deviations from the perpendicular arrangement do not change the operation of the coupler, and may easily be made. The only requirement that must be met is that the pair of apertures continue to maintain their diagonally opposite quadrantal positioning on opposite sides of the center line of each wave guide section. This requirement can easily be met even though the angle between the two guides is somewhat less than 90°. Of course $d_1$ and $d_2$, each measured along the axis of a respective guide, must maintain the relationship indicated above.

Although the wave guide coupler above discussed was described as using apertures for coupling between the two guides, the present invention is not limited to this particular type of coupling means. Conducting loops or other types of coupling may also be used to link the magnetic fields of the two guides. As illustrated in Figs. 9 and 10, it is possible by the use of a pair of coupling loops 22, 27 in each wave guide section to construct a directional coupler in which the main wave guide section 10 is separated from the auxiliary wave guide section 11. In such a coupler the coupling loops 22, 27 may be connected by a pair of coaxial line sections 26 which have the same electrical length and thus do not disturb the required 180° phase difference between two induced waves in the auxiliary wave guide.

In order for a coupler having a pair of coupling means, such as apertures or coupling loops, to exhibit high directivity properties, it is necessary that the waves induced in the auxiliary guide section by each of the coupling means must cancel in one direction. That is the two induced waves travelling in one direction must be 180° out of phase. If the directivity is to be independent of frequency the 180° phase difference must be accomplished in a manner independent of physical dimensions, and thus must be achieved electrically. In transmission lines having a single conductor such as hollow pipe guides, the electrical phase reversal may be achieved, as has been pointed out, by utilizing the magnetic field phase reversal as the wave guide center line is crossed. This phase reversal effect is in no way dependent upon frequency.

It should be understood, of course, that the functions of the main guide and auxiliary guide in the above couplers may be reversed without in any way changing the operation of the coupler. Because of reciprocity, the same directivity and attenuation will be realized.

One use of such directional couplers is to accurately measure the power being transmitted from an ultra-high-frequency energy source to a suitable load, the accuracy of such measurement being independent of changes in operating frequency and of the presence of standing waves in the transmission line system. The directional coupler is connected with its main guide or line section in tandem with the transmission line connecting the source of ultra-high-frequency to the load. A predetermined fraction of the power travelling in the main transmission line section is induced into the auxiliary transmission line section. This fraction is, of course, dependent upon the attenuation factor of the directional coupler selected, and is independent of the operating frequency in an ideal directional coupler.

A power responsive element of any conventional type, such as a bolometer or thermistor, is located in that end of the auxiliary line section toward which the wave induced therein by power travelling from the source to the load in the main line section is directed. By measuring the amount of power of the induced wave in the auxiliary line and knowing the attenuation of the coupler, it is thus possible to determine the amount of power travelling in the main line from the source to the load. If the directivity of the coupler is high, as it is in a coupler constructed in accordance with this invention, little or no energy is induced in the auxiliary line section in the direction away from the power measuring element by the power travelling from the source to the load. If any such residual low-intensity propagation exists in that direction, it may be made ineffective by terminating that end of the auxiliary line section by a power-absorbing matched termination of any known type.

Power which flows in the opposite direction in the main line section, such as results from reflections occurring at the load, will also tend to induce a wave in the auxiliary line section, but in a direction away from the power responsive element. The undesirable induced power travelling in the direction away from the power responsive element will be absorbed by the power absorbing matched termination and will thus not affect the power responsive element.

Therefore, in such a power measuring system, by the use of a directional coupler of this type, the power flowing in one direction in a transmission line may be accurately measured over a wide range of operating frequencies. Furthermore, this measurement is independent of any power flowing in the opposite direction in the transmission line, as may occur when undesired energy reflections exist in the line.

Thus, by the use of the teachings of the present invention, it is possible to construct a directional coupler having a high degree of directivity which is independent of operating frequency. Furthermore, a wave guide coupler constructed in accordance with this invention may have its main and auxiliary wave guides oriented at right angles to each other with their broad faces in contact. It is possible to choose among a wide range of attenuations by suitable design, without decreasing the desired frequency insensitive directivity.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Ultra high frequency apparatus comprising a first section of rectangular wave guide and a second section of rectangular wave guide oriented substantially at right angles to said first section of wave guide and having a common broad wall section therewith, said first and second wave guide sections being adapted to convey ultra high frequency electromagnetic energy, said common broad wall section having spaced first and second energy-intercoupling apertures therein situated in diagonally opposite quadrants of said common broad wall section as defined by the center lines of said wave guides.

2. Ultra high frequency apparatus as defined in claim 1, wherein each of said first and second energy-intercoupling apertures is an elongated narrow slit.

3. Ultra high frequency apparatus as defined in claim 1, wherein said first and second energy intercoupling apertures are elongated narrow slits both parallel to the center line of one of said sections of wave guide.

4. Ultra high frequency apparatus as defined in claim 1, wherein each of said first and second apertures is cross-shaped.

5. Ultra high frequency apparatus as defined in claim 1, wherein each of said first and second apertures is shaped as two intersecting narrow slits, one substantially parallel to the center line of said first section of wave guide and the other substantially parallel to the center line of said second section of wave guide.

6. Ultra high frequency apparatus comprising a first section of rectangular wave guide and a second section of rectangular wave guide oriented substantially at right angles to said first section of wave guide, said first and second sections of wave guide being each adapted to convey ultra high frequency electromagnetic energy, said first and second sections of wave guide each having a substantially square internal portion of a broad wall thereof parallel to and coextensive with a second substantially square internal portion of broad wall directly opposite in the other of the wave guide sections, said first and second square wall portions defining two pairs of substantially parallel diagonals, and first and second means intercoupling the interior of said first section of wave guide with the interior of said second section of wave guide, said second intercoupling means being symmetrically displaced from said first intercoupling means about a plane containing one pair of parallel diagonals of said first square wall portion and said second square wall portion, said first and second intercoupling means being situated in diagonally opposite quadrants of said parallel substantially square coextensive broad wall portions, the quadrants being defined by the center lines of said wave guides.

7. Ultra high frequency apparatus as defined in claim 6, wherein said first section of wave guide is spaced an appreciable distance from said second section of wave guide, each of said first and second means intercoupling the interior of said first section of wave guide with the interior of said second section of wave guide comprising a coaxial transmission line extending substantially perpendicularly between said first and second substantially square internal wall portions, and having a coupling loop on one end thereof inside said first section of wave guide and a coupling loop on the opposite end thereof inside the second section of wave guide.

8. Ultra-high-frequency apparatus comprising a first section of rectangular wave guide, a second section of rectangular wave guide oriented substantially at right angles to said first section and having a common broad wall section therewith, said first and second wave guide sections being adapted to convey ultra-high-frequency electromagnetic energy, said common broad wall section having a pair of cross-shaped apertures therein situated in diagonally opposite quadrants of said common broad wall section as defined by the center lines of said wave guides, one arm of each of said cross-shaped apertures being oriented parallel to a diagonal of said common broad wall section and the other arm of each of said cross-shaped apertures being oriented normal to said diagonal.

9. Ultra-high-frequency apparatus comprising a first section of rectangular wave guide, a similar second section of rectangular wave guide oriented at substantially right angles to said first section and having a common broad wall section therewith, said first and second wave guide sections being adapted to convey ultra-high-frequency electromagnetic energy, said common broad wall section having a pair of cross-shaped apertures therein situated in diagonally opposite quadrants of said common broad wall section as defined by the center lines of said wave guides, the distances of the geometric centers of said apertures from each of said center lines being equal, and the arms of said cross-shaped apertures being oriented at 45° to said wave guides.

10. Ultra-high-frequency apparatus comprising a first section of rectangular wave guide, a second section of rectangular wave guide oriented substantially at right angles to said first section of wave guide and having a common broad wall section therewith, said first and second wave guide sections being adapted to convey ultra-high-frequency electromagnetic energy, said common broad wall section having first and second energy-intercoupling apertures therein situated in diagonally opposite quadrants of said common broad wall section as defined by the center lines of said wave guides, said apertures being cross-shaped.

11. Ultra-high-frequency apparatus comprising a first section of rectangular wave guide and a second section of rectangular wave guide oriented substantially at right angles to said first section of wave guide and having a common broad wall section therewith, said first and second wave guide sections being adapted to convey ultra - high - frequency electromagnetic energy, said common broad wall section having spaced first and second energy-intercoupling apertures therein situated in diagonally opposite quadrants of said common broad wall section as defined by the center lines of said wave guides.

THEODORE MORENO.

REFERENCES CITED

The following references are of record in the file of this patent:

UNITED STATES PATENTS

| Number | Name | Date |
|---|---|---|
| 2,241,119 | Dallenbach | May 6, 1941 |
| 2,416,567 | McArthur | Feb. 25, 1947 |
| 2,423,390 | Korman | July 1, 1947 |
| 2,473,274 | Bradley | June 14, 1949 |
| 2,512,191 | Wolf | June 20, 1950 |

FOREIGN PATENTS

| Number | Country | Date |
|---|---|---|
| 545,936 | Great Britain | June 18, 1942 |

OTHER REFERENCES

"The Journal of the Institution of Electrical Engineers," vol. 93, Part IIIA (Radiolocation), No. 4, 1946. Radio Section Paper, "Directive Couplers in Wave Guides," by M. Surdin, pp. 725–736 of the magazine. Using page 730 in particular published January 17, 1947, by The Institution, Savoy Place, Victoria Embankment, London W. C. 2. Copy in 178–44.1F.